(12) United States Patent
Pang et al.

(10) Patent No.: US 11,546,199 B2
(45) Date of Patent: Jan. 3, 2023

(54) PACKET DETECTION AND TIMING SYNCHRONIZATION FOR HIGH PERFORMANCE WIRELESS COMMUNICATIONS IN SUBSTATION AUTOMATION

(71) Applicant: Hitachi Energy Switzerland AG, Baden (CH)

(72) Inventors: Zhibo Pang, Västerås (SE); Michele Luvisotto, Västerås (SE); Dacfey Dzung, Wettingen (CH)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 16/969,704

(22) PCT Filed: Feb. 13, 2018

(86) PCT No.: PCT/EP2018/053524
§ 371 (c)(1),
(2) Date: Aug. 13, 2020

(87) PCT Pub. No.: WO2019/158181
PCT Pub. Date: Aug. 22, 2019

(65) Prior Publication Data
US 2021/0006448 A1    Jan. 7, 2021

(51) Int. Cl.
*H04L 27/26* (2006.01)

(52) U.S. Cl.
CPC ...... *H04L 27/2656* (2013.01); *H04L 27/2671* (2013.01); *H04L 27/2675* (2013.01)

(58) Field of Classification Search
CPC ............. H04L 27/2671; H04L 27/2675; H04L 27/2656
See application file for complete search history.

(56) References Cited

U.S. PATENT DOCUMENTS 7,280,621 B1    10/2007  Murphy
7,436,906 B2    10/2008  Goto
(Continued)

FOREIGN PATENT DOCUMENTS

CN    101467409 A    6/2009
CN    101536448 A    9/2009
(Continued)

OTHER PUBLICATIONS

Tang, Haiyun, et al., "Synchronization Schemes for Packet OFDM System", New Frontiers in Telecommunications, vol. 5, 2003 IEEE International Conference on Communications, May 11-15, 2003, pp. 3346-3350.
(Continued)

*Primary Examiner* — Ayaz R Sheikh
*Assistant Examiner* — Debebe A Asefa
(74) *Attorney, Agent, or Firm* — Slater Matsil, LLP

(57) ABSTRACT

A method for packet detection in a wireless communication network employing time based scheduling of packets. The method is performed by a packet receiver in the wireless communication network. The method includes receiving a packet from a packet transmitter. The packet includes a preamble that is composed of a single orthogonal frequency-division multiplexing (OFDM) symbol and represented by a sequence of samples. T least part of the preamble is received within a packet detection window. Packet detection is performed in order to find a start of the packet only on those samples received within the packet detection window.

23 Claims, 5 Drawing Sheets

(56) References Cited

U.S. PATENT DOCUMENTS

| | | | |
|---|---|---|---|
| 7,480,334 B2 | 1/2009 | Nair | |
| 7,756,005 B2 | 7/2010 | Murthy et al. | |
| 7,924,801 B2 | 4/2011 | Kang et al. | |
| 8,213,523 B2 | 7/2012 | Birru et al. | |
| 2002/0191809 A1* | 12/2002 | Kirovski | H04L 9/30 382/100 |
| 2007/0055501 A1 | 3/2007 | Aytur et al. | |
| 2008/0107200 A1 | 5/2008 | Zhu et al. | |
| 2010/0135422 A1 | 6/2010 | Lee et al. | |
| 2017/0288923 A1* | 10/2017 | Senaratne | H04L 1/00 |
| 2018/0284735 A1* | 10/2018 | Celia | H04L 1/0041 |
| 2020/0322002 A1* | 10/2020 | Vijayasankar | H04L 12/413 |

FOREIGN PATENT DOCUMENTS

| | | | |
|---|---|---|---|
| CN | 102187608 A | 9/2011 | |
| EP | 1821477 B1 | 7/2012 | |
| EP | 2983436 A1 | 2/2016 | |

OTHER PUBLICATIONS

National Intellectual Property Administration of the People's Republic of China, Notification of the First Office Action, Application No. 2018800891290, dated Jan. 28, 2021, 10 total pages.

* cited by examiner

PACKET DETECTION AND TIMING SYNCHRONIZATION FOR HIGH PERFORMANCE WIRELESS COMMUNICATIONS IN SUBSTATION AUTOMATION

CROSS-REFERENCE TO RELATED APPLICATIONS

This application is a national stage application of International Application No. PCT/EP2018/053524, filed on Feb. 13, 2018, which application is incorporated herein by reference.

TECHNICAL FIELD

Embodiments presented herein relate to a method, a packet receiver, a computer program, and a computer program product for packet detection in a wireless communication network for power grid control.

BACKGROUND

Wireless networks to be used in the control of power grids, for example in substation automation, require low latency and high reliability. Currently available industrial wireless standards, such as WirelessHART (where HART is short for Highway Addressable Remote Transducer) or Wireless Network for Industrial Automation—Factory Automation (WIA-FA), are not able to provide very high performance in these regards, because they rely on non-optimized physical (PHY) communications layers. For example, WIA-FA is based on the IEEE 802.11g/n PHY layer, whose minimum transmission time for a packet of 100 bits is around 30 μs, while many power grid applications, currently based on wired local area networks (LANs) compliant with IEC 61850, require a slot time of a few μs or even lower.

One cause of the long transmission time in IEEE 802.11 is the use of long preamble sequences at the PHY layer. However, the long preamble in IEEE 802.11 is used for many purposes, including robust packet detection and timing synchronization, which are crucial to ensure reliable message delivery. In this respect, packet detection generally refers to the process of approximately identifying the beginning of a packet, while timing synchronization generally refers to the process of finding the exact sample at which the useful part (such as the payload) of the packet begins.

Existing schemes for packet detection and timing synchronization (e.g. as disclosed in U.S. Pat. No. 7,480,234 B1 and U.S. Pat. No. 7,280,621 B1) rely on the presence of long repeated sequences in the packet preamble, enabling the packet receiver to first correlate a known transmitted preamble with the received samples in order to detect the packet, and then correlate the repeated parts to achieve precise sample-level synchronization. However, using a long preamble is not efficient when the packet size is short (e.g. as being the case in power grid control applications) and thus fundamentally limits the achievable latency.

Hence, there is still a need for improved packet detection in wireless communication networks suitable for in the control of power grids.

SUMMARY

An object of embodiments herein is to provide efficient packet detection that does not suffer from the issues identified above, or at least where the issues noted above are reduced or mitigated.

According to a first aspect there is presented a method for packet detection in a wireless communication network for power grid control. The wireless communication network employs time based scheduling of packets. The method is performed by a packet receiver in the wireless communication network. The method comprises receiving a packet from a packet transmitter. The packet comprises a preamble. The preamble is composed of a single OFDM symbol and represented by a sequence of samples. At least part of the preamble is received within a packet detection window. The method comprises performing packet detection in order to find start of the packet only on those samples received within the packet detection window.

According to a second aspect there is presented a packet receiver for packet detection in a wireless communication network for power grid control. The wireless communication network employs time based scheduling of packets. The packet receiver comprises processing circuitry. The processing circuitry is configured to cause the packet receiver to receive a packet from a packet transmitter. The preamble is composed of a single OFDM symbol and represented by a sequence of samples. At least part of the preamble is received within a packet detection window. The processing circuitry is configured to cause the packet receiver to perform packet detection in order to find start of the packet only on those samples received within the packet detection window.

According to a third aspect there is presented a computer program for packet detection in a wireless communication network for power grid control, the computer program comprising computer program code which, when run on a packet receiver, causes the packet receiver to perform a method according to the first aspect.

According to a fourth aspect there is presented a computer program product comprising a computer program according to the third aspect and a computer readable storage medium on which the computer program is stored. The computer readable storage medium could be a non-transitory computer readable storage medium.

Advantageously this provides efficient packet detection.

Advantageously, the proposed packet detection does not suffer from the issues noted above.

Advantageously, the proposed method allows an efficient packet structure, enabling low latency wireless communications.

Indeed, reducing the preamble duration from five OFDM symbols (as in IEEE 802.11g) to just one OFDM symbol allows a reduction of nearly five times in transmission time for too bits packets, achieving a transmission latency similar to wired communication networks.

Advantageously, the proposed method allows for robust packet detection and timing synchronization to be performed also when the preamble is short.

Advantageously the use of the packet detection window allows the packet detection to be disabled when not needed, thus saving energy.

It is to be noted that any feature of the first, second, third, and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
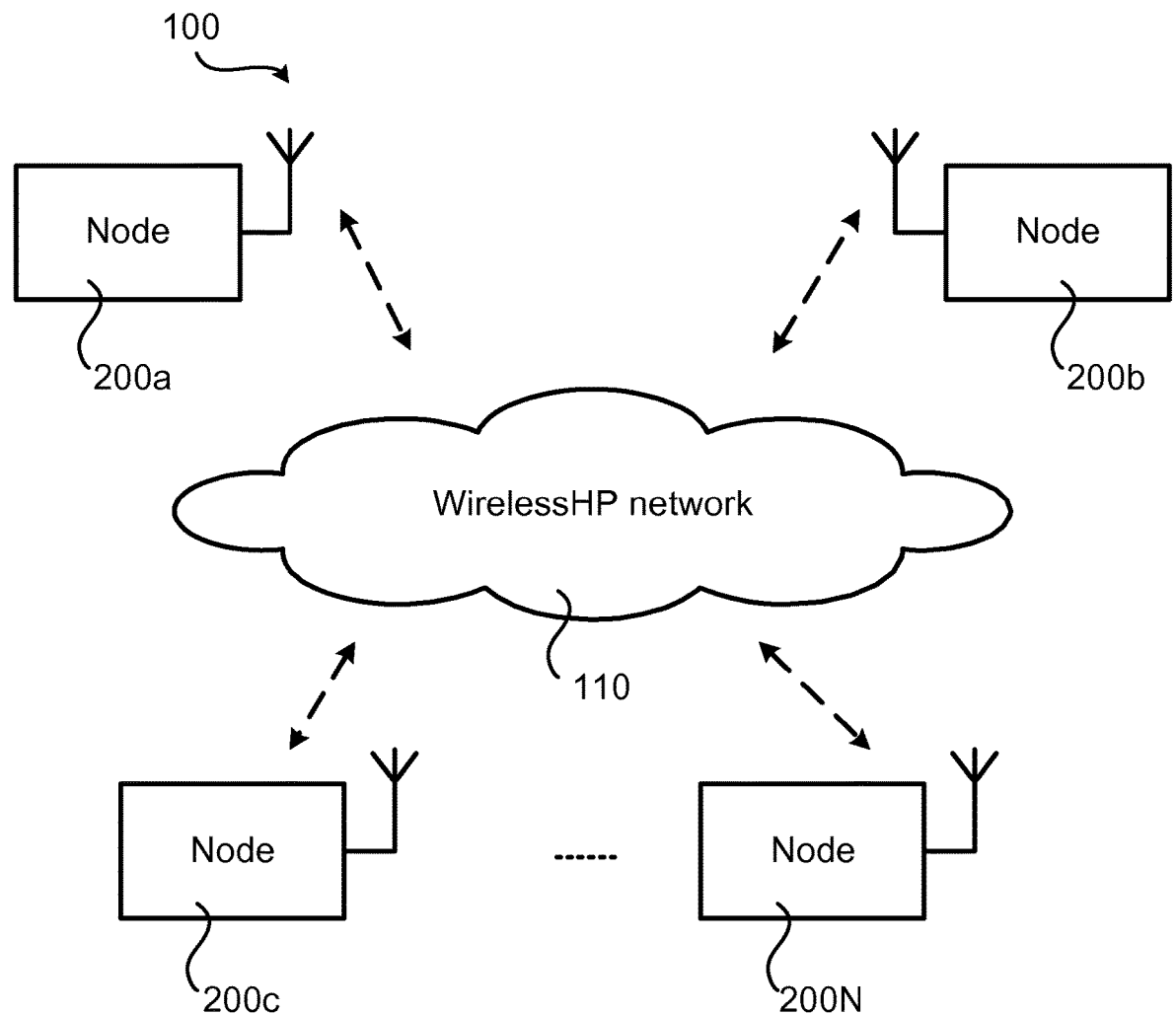
FIG. 1 is a schematic diagram illustrating a wireless communication network according to embodiments.

FIG. 1 schematically illustrates a wireless communication network 100 wherein the herein disclosed embodiments apply. Network entities denoted nodes 200a, 200b, . . . , 200N are equipped with a radio frequency (RF) front-end that allows them to communicate over a wireless network 110. Each node may represent a component of a substation automation system, such as a gateway, circuit breaker, circuit protector, transformer, switchgear, etc., that is configured for exchanging control messages.

Each node 200a-200N may selectively act as a packet transmitter or a packet receiver. Without loss of generality it will hereinafter be assumed that node 200a will act as a packet receiver and that any of nodes 200b-200N will act as a packet transmitter.

Figure 2:
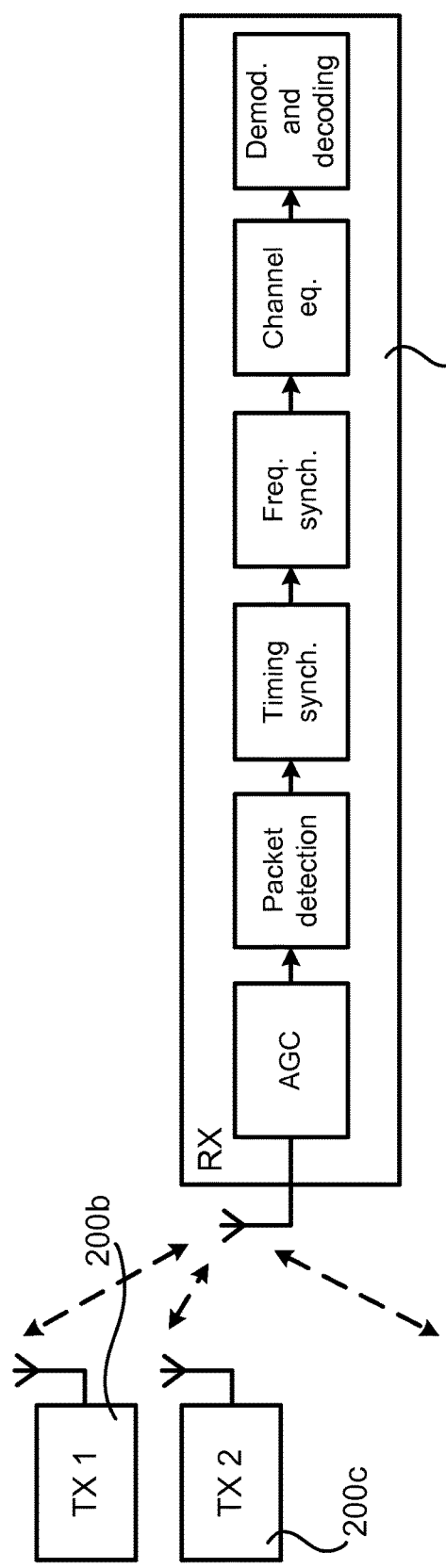
FIG. 2 schematically illustrates a packet receiver according to state of the art.

FIG. 2 schematically illustrates typical modules of a packet receiver 200a. The packet receiver 200a of FIG. 2 comprises an automatic gain control module, a packet detection module, a timing synchronization module, a frequency synchronization module, a channel equalization module, and a demodulation and decoding module. The functionality of these modules is as such known in the art and a description thereof is therefore omitted for brevity. In currently existing packet receivers 200a, these modules are implemented based on exploiting long repeated sequences in the preamble of the received packets.

Figure 3:
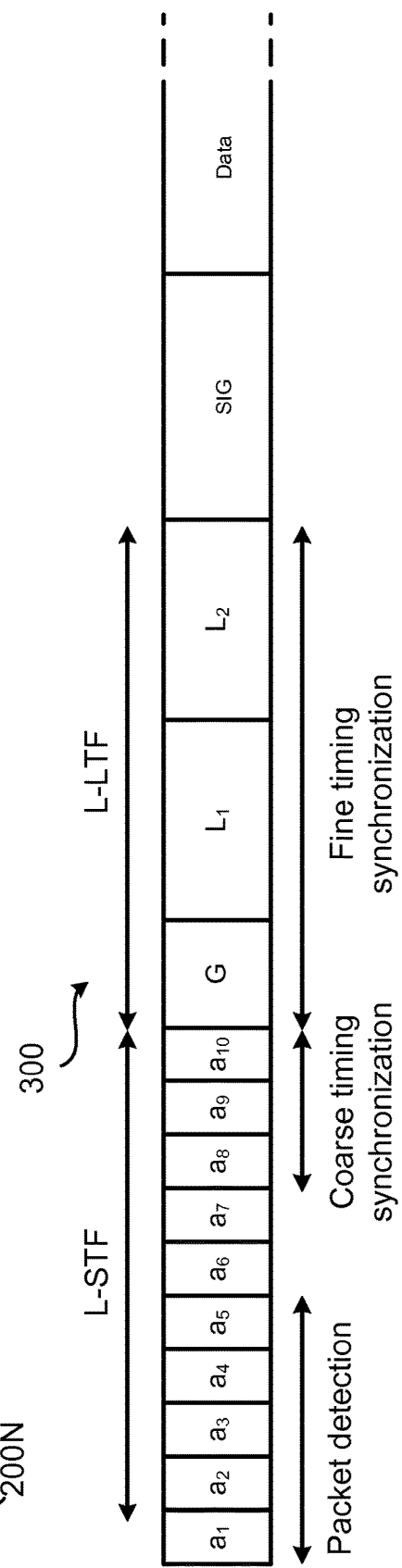
FIG. 3 schematically illustrates a packet structure according to state of the art.

As an illustrative example, FIG. 3 schematically illustrates the packet structure of a packet 300 used in IEEE 802.11g. In IEEE 802.11g the first short training sequences, $a_1, a_2, \ldots, a_7$, of the legacy short training field (L-STF) part of the PHY layer preamble are used for packet detection, while the last ones, $a_8, a_9, a_{10}$, and the long training sequences, $l_1, l_2$, of the legacy long training field (L-LTF) part are used for coarse and fine timing synchronization respectively.

In order to achieve low latency for short-size packets exchanged in wireless networks for power grid control applications, the size of the PHY layer preamble should be kept small, possibly limited to just one single orthogonal frequency-division multiplexing (OFDM) symbol. To preserve a good level of reliability, however, the packet receiver 200a must still be able to perform its usual functions, including packet detection and timing synchronization, using only this single OFDM symbol.

The embodiments disclosed herein thus relate to mechanisms for packet detection in a wireless communication network 100 for power grid control. In order to obtain such mechanisms there is provided a packet receiver 200a, a method performed by the packet receiver 200a, a computer program product comprising code, for example in the form of a computer program, that when run on a packet receiver 200a, causes the packet receiver 200a to perform the method.

To achieve low latency the packet structure is optimized and a short preamble is used. Further, in order to ensure reliable communications, knowledge of the packet scheduling is used by a start-of-packet prediction mechanism that allows simple and reliable packet detection and timing synchronization, even when a short preamble is adopted.

Figure 4:
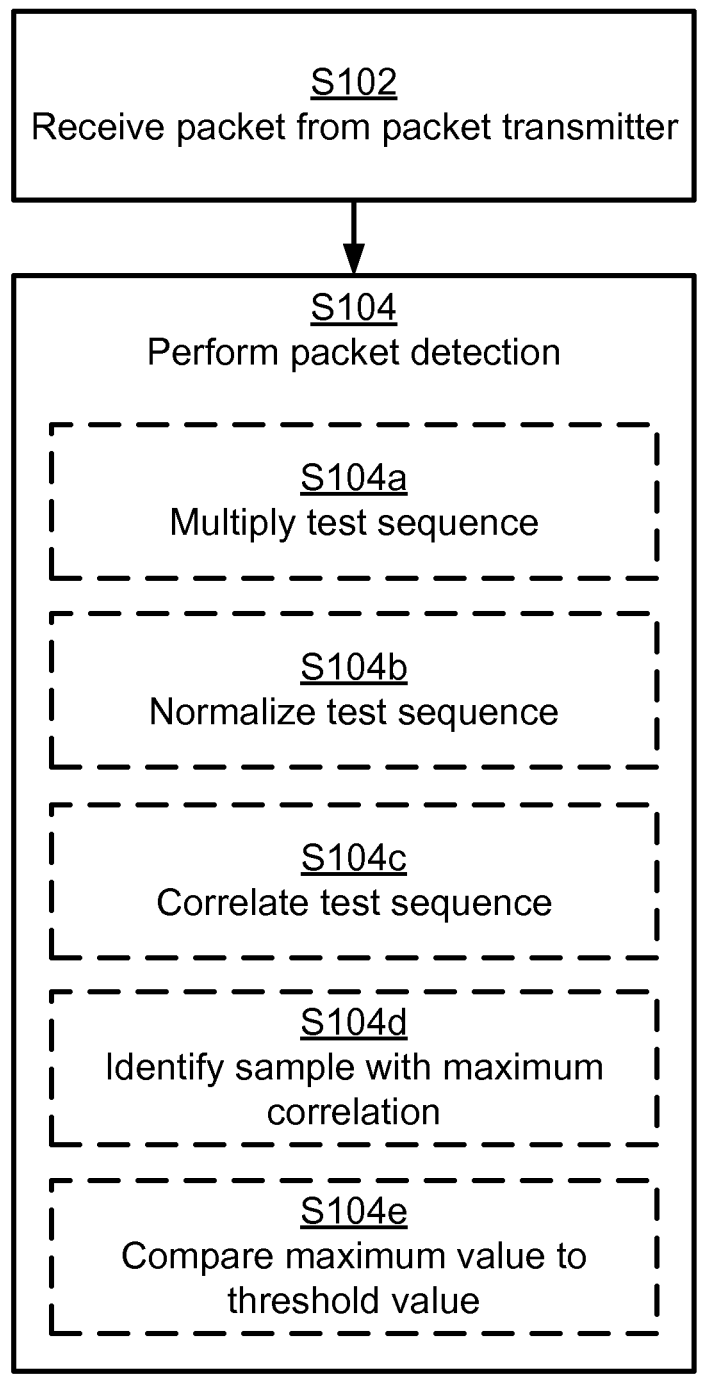
FIG. 4 is a flowchart of methods according to embodiments.

FIG. 4 is a flowchart illustrating embodiments of methods for packet detection in a wireless communication network 100 for power grid control.

The wireless communication network 100 employs time based scheduling of packets. The methods are performed by the packet receiver 200a. The methods are advantageously provided as computer programs 820.

It is assumed that the node acting as packet receiver 200a receives a packet 600 from one of the other nodes acting as packet transmitter 200b-200N. The packet receiver 200a is thus configured to perform step S102:

S102: The packet receiver 200a receives a packet 600 from a packet transmitter 200b-200N.

The packet 600 comprises a preamble 610. The preamble 610 is composed of a single OFDM symbol and represented by a sequence of samples. In some aspects the single OFDM symbol has a duration that corresponds to the first five L-STF short sequences in FIG. 3.

At least part of the preamble 610 is received within a packet detection window 630. Indeed, in wireless communication networks used for control applications, unlike in traditional communication networks, the channel access is regulated through time-slotted scheduling policies (e.g. time-division multiple access (TDMA)) to ensure determinism and avoid collisions. In this way, each node (acting as a packet receiver 200a) in the wireless communication network 100 knows that it can receive packets only during predefined time slots. This fact is exploited by the packet receiver 200a to only receive packets within the packet detection window 630.

The packet receiver 200a then performs packet detection. Particularly, the packet receiver 200a is configured to perform step S104:

S104: The packet receiver 200a performs packet detection in order to find start 640' of the packet 600. The packet detection is performed only on those samples that are received within the packet detection window 630.

Advantageously, this enables simultaneous packet detection and timing synchronization. As disclosed above, packet detection generally refers to the process of approximately identifying the beginning of a (received) packet 600 and timing synchronization generally refers to the process of finding the exact sample at which the useful part (such as the payload) of the packet 600 begins.

Embodiments relating to further details of packet detection in a wireless communication network 100 for power grid control as performed by the packet receiver 200a will now be disclosed.

Figure 5:
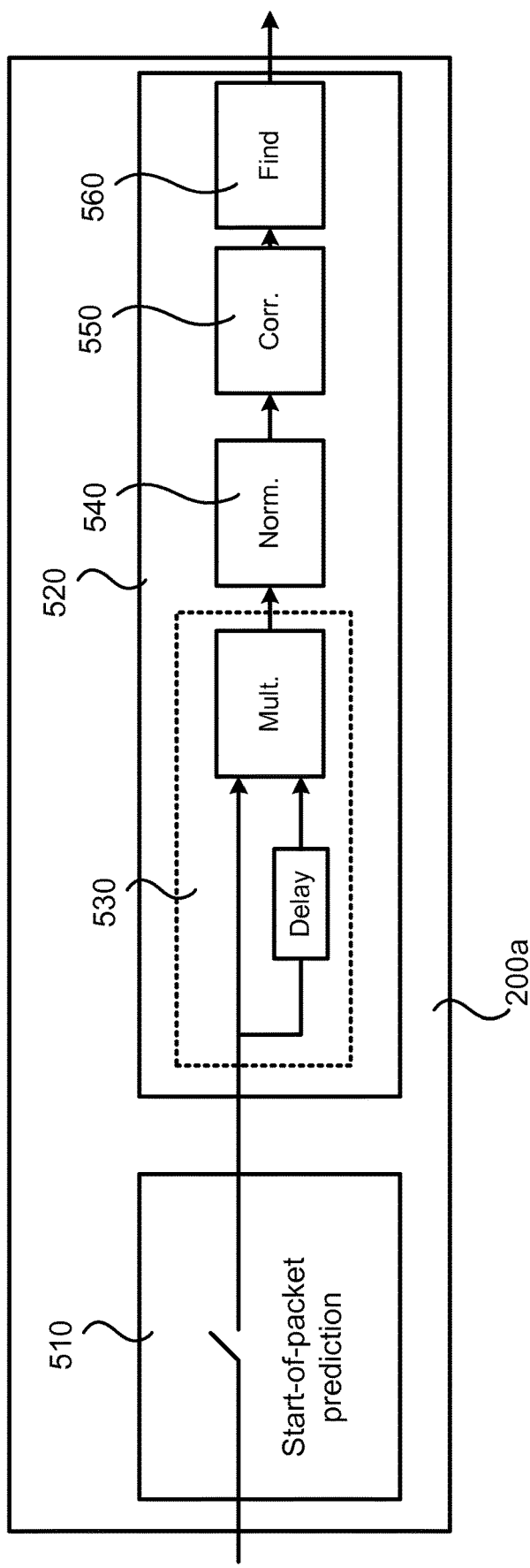
FIG. 5 is a schematic diagram showing functional modules of a packet receiver according to an embodiment.

Parallel reference is made to FIG. 5 showing functional modules of the packet receiver 200a for packet detection and timing synchronization according to an embodiment The packet receiver 200a in FIG. 5 comprises a start-of-packet prediction module 510. The start-of-packet prediction module 510 is configured to selectively enable and disable the detection of packets 610, and hence when to open and close the packet detection window 630. Further aspects of the start-of-packet prediction module 510 will be disclosed below.

There may be different ways to perform the packet detection in step S104. Different embodiments relating thereto will now be described in turn.

In some aspects the packet detection in step S104 is based on comparing those samples received within the packet detection window 630 with a default sequence. Particularly, according to an embodiment performing packet detection involves determining a similarity measure between a representation of those samples received within the packet detection window 630 and a default normalized test sequence. In the example of FIG. 5 the similarity measure is determined by the differential detection module 520.

There could be different ways to derive the representation of the samples from the samples themselves.

The packet receiver 200a in FIG. 5 comprises a delay and multiply module 530. The delay and multiply module 530 is configured to create a one-sample delayed copy of the received sequence and multiply this one-sample delayed copy with the original received sequence through a Hadamard product.

Particularly, according to an embodiment the samples received within the packet detection window 630 defines a test sequence. The packet receiver 200a is then configured to perform (optional) step S104a as part of performing the packet detection in step S104:

S104a: The packet receiver 200a multiplies the test sequence with a one-sample delayed copy of itself, resulting in a multiplied test sequence.

In this way the impact of frequency offsets in the detection performance is minimized.

The packet receiver 200a in FIG. 5 comprises a normalize module 540. The normalize module 54o is configured to normalize the multiplied test sequence with respect to its average power. Thus, according to an embodiment the packet receiver 200a is configured to perform (optional) step S104b as part of performing the packet detection in step S104:

S104b: The packet receiver 200a normalizes the multiplied test sequence with respect to its total power, resulting in a normalized test sequence.

In this way the detection process is independent on the receiving power.

The packet receiver 200a in FIG. 5 comprises a correlate module 550. The correlate module 550 is configured to compare the normalized test sequence to a default sequence. According to an embodiment the packet receiver 200a is thus configured to perform (optional) step S104c as part of performing the packet detection in step S104:

S104c: The packet receiver 200a correlates the normalized test sequence with a default normalized test sequence, resulting in a correlated test sequence.

The representation of those samples received within the packet detection window 630 is thus defined by the normalized test sequence.

There could be different examples of default normalized test sequences. According to an embodiment the default normalized test sequence is a default preamble sequence (also multiplied by its one-sample delayed version and normalized).

The packet receiver 200a in FIG. 5 comprises a find maximum module 560. The find maximum module 560 is configured to find the maximum value of the correlated test sequence. Particularly, according to an embodiment the packet receiver 200a is configured to perform (optional) step S104d as part of performing the packet detection in step S104:

S104d: The packet receiver 200a identifies the sample in the test sequence for which the correlated test sequence has its maximum value. The sample is to then determined to define the start 640' of the packet 600.

This enables the precise sample at which the packet 600 starts to be found.

In some aspects the start 640' of the packet 600 is only successfully identified when the maximum value of the correlated test sequence exceeds a specified packet detection threshold value $\Delta$. Therefore, according to an embodiment the packet receiver 200a is configured to perform (optional) step S104e as part of performing the packet detection in step S104:

S104e: The packet receiver 200a compares the maximum value to a packet detection threshold value $\Delta$. The sample is then determined to define the start 640' of the packet 600 only when the maximum value exceeds the packet detection threshold value $\Delta$. In some aspects the value of $\Delta$ depends on the expected signal to noise ratio (SNR) at the packet receiver 200a and/or the length of the preamble 610. The SNR might, for example, be determined based on the transmission bandwidth, the transmission power and the link distance. For each SNR and preamble length, an optimal packet detection threshold value $\Delta$ can be obtained via theoretical analysis or simulations.

Further aspects of the packet detection window 630 and the start-of-packet prediction module 510 will now be disclosed.

Figure 6:
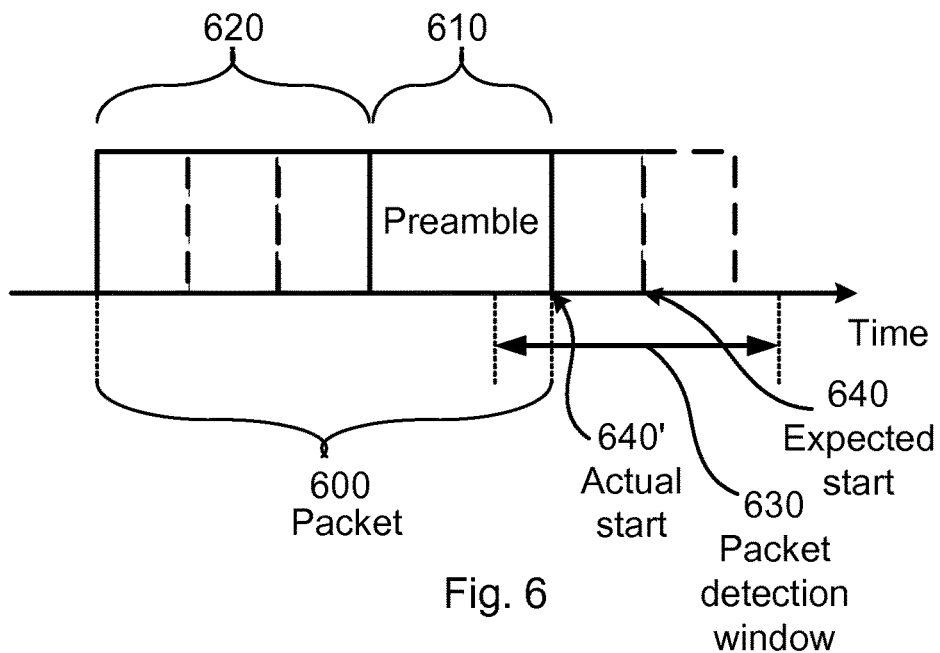
FIG. 6 schematically illustrates packet detection within a packet detection window according to an embodiment.

In some aspects the packet detection window 630 is centered on the expected start instant 640 of the received packet 600, as shown in FIG. 6. The packet 600 comprises a preamble 610 and a data part 620. As disclosed above, packet detection is enabled only during this window. According to an embodiment the packet detection window 630 is opened according to the time based scheduling. A packet detection window 630 of two or more samples is considered rather than a single sample, because the actual arrival time of the packet 600 can be slightly delayed or anticipated with respect to the expected one due to synchronization mismatches between the packet receiver 200a and the packet transmitter 200b-200N, as illustrated in FIG. 6.

The duration of the packet detection window 630 is dimensioned to ensure that the maximum deviation between the expected arrival time (as defined by the start instant 640) and the actual arrival time (as defined by the start 640) of the packet 600 lies within the packet detection window 630.

The expected arrival time of the packet 600 can be derived based on the nominal distance, $d_0$, between the packet transmitter 200b-200N and the packet receiver 200a. The actual arrival time depends on the actual distance, d, between the packet transmitter 200b-200N and the packet receiver 200a. The maximum absolute difference between d and $d_0$, which is defined by $d_{max}$ is strictly related to the maximum transmission and reception range of the wireless communication network 100.

The duration of the packet detection window (in seconds) should be set to:

$$T = \frac{2 \cdot d_{max}}{c},$$

where $c=2.99792 \times 10^8$ m/s is the speed of light.

According to an embodiment the packet detection window 630 has a length in time of between 100 ns to 200 ns, preferably between 125 ns and 175 ns, most preferably 150 ns.

The duration, W, of the packet detection window 630 in samples generally depends on the sampling interval, $T_s$, at the packet receiver 200a and can be determined as:

$$W = \left\lceil \frac{T}{T_s} \right\rceil.$$

As a non-limiting illustrative example, with a maximum distance deviation of $d_{max}=20$ m and a sampling interval of $T_s=50$ ns, the packet detection window has a length of T=133.4 ns, corresponding to W=3 samples.

The use of the packet detection window 630 to enable/disable packet detection allows a simpler decoding process and lower energy consumption, since the packet receiver 200a does not need to continuously correlate all the received samples but only those within the packet detection window 630.

Further, the use of the packet detection window 630 improves the reliability of the packet detection process. In more detail, since the preamble 610 is short, the correlation determined in step S104c is generally weaker with respect to typical correlations computed on longer sequences (e.g. using the IEEE 802.11 preamble). For this reason, so-called "false alarms" can arise, in which a sequence of noisy samples is erroneously identified as the beginning of a packet. The use of the packet detection window 630 allows to considerably mitigate this issue, since detection is only performed on a window of samples during which the packet 600 is expected to arrive.

Figure 7:
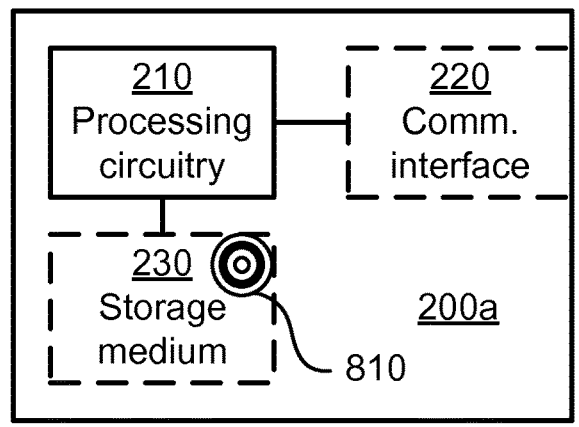
FIG. 7 is a schematic diagram showing functional units of a packet receiver according to an embodiment.

FIG. 7 schematically illustrates, in terms of a number of functional units, the components of a packet receiver 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the packet receiver 200a to perform a set of operations, or steps, S102-S104e, as disclosed above. For example, the storage medium 230 may store the set of operations, and the processing circuitry 210 may be configured to retrieve the set of operations from the storage medium 230 to cause the packet receiver 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The packet receiver 200a may further comprise a communications interface 220 at least configured for communications with at least one packet transmitter 200a-200N. As such the communications interface 220 may comprise one or more transmitters and receivers, comprising analogue and digital components. The processing circuitry 210 controls the general operation of the packet receiver 200a e.g. by sending data and control signals to the communications interface 220 and the storage medium 23o, by receiving data and reports from the communications interface 220, and by retrieving data and instructions from the storage medium 230. Other components, as well as the related functionality, of the packet receiver 200a are omitted in order not to obscure the concepts presented herein.

Figure 8:
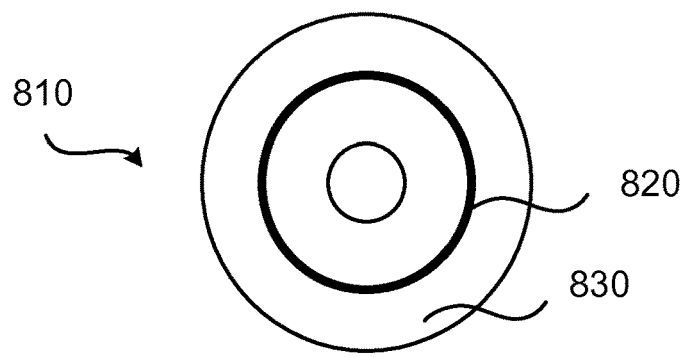
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for packet detection in a wireless communication network employing time based scheduling of packets, the method being performed by a packet receiver in the wireless communication network, the method comprising:
receiving a packet from a packet transmitter, wherein the packet comprises a preamble that is composed of a single orthogonal frequency-division multiplexing (OFDM) symbol and represented by a sequence of samples, wherein at least part of the preamble is received within a duration of a packet detection window, and wherein the packet detection window is centered on an expected arrival time of the packet; and
performing packet detection to find a start of the packet only on those samples received within the duration of the packet detection window.

2. The method according to claim 1, wherein performing packet detection comprises determining a similarity measure between a representation of the samples received within the packet detection window and a default normalized test sequence.

3. The method according to claim 2, wherein the default normalized test sequence is a default preamble sequence.

4. The method according to claim 2 wherein the representation of the samples received within the packet detection window is defined by the default normalized test sequence.

5. The method according to claim 1, wherein the samples received within the packet detection window define a test sequence and wherein performing packet detection further comprises multiplying the test sequence with a one-sample delayed copy of itself, resulting in a multiplied test sequence.

6. The method according to claim 5, wherein performing packet detection further comprises normalizing the multiplied test sequence with respect to its total power, resulting in a normalized test sequence.

7. The method according to claim 6, wherein performing packet detection further comprises correlating the normalized test sequence with a default normalized test sequence, resulting in a correlated test sequence.

8. The method according to claim 7, wherein the default normalized test sequence is a default preamble sequence.

9. The method according to claim 7, wherein the representation of the samples received within the packet detection window is defined by the normalized test sequence.

10. The method according to claim 7, wherein performing packet detection further comprises identifying a sample in the test sequence for which the correlated test sequence has its maximum value, wherein the identified sample is determined to define the start of the packet.

11. The method according to claim 7, wherein performing packet detection further comprises:
identifying a sample in the test sequence for which the correlated test sequence has its maximum value; and
comparing the maximum value to a packet detection threshold value, wherein the identified sample is determined to define the start of the packet only when the maximum value exceeds the packet detection threshold value.

12. The method according to claim 1, wherein the packet detection window is opened according to the time based scheduling.

13. The method according to claim 1, wherein the packet detection window has a length in time of between 100 ns to 200 ns.

14. The method according to claim 1, wherein the packet detection window has a length in time of between 125 ns and 175 ns.

15. The method according to claim 1, wherein the packet receiver is part of a gateway, circuit breaker, circuit protector, transformer, or switchgear.

16. The method according to claim 1, wherein the packet transmitter is part of a gateway, circuit breaker, circuit protector, transformer, or switchgear.

17. The method according to claim 1, wherein the wireless communication network is associated with a power grid and wherein the packet carries information related to the power grid.

18. The method according to claim 1, wherein the duration of the packet detection window corresponds to a difference between an expected arrival time of the packet and an actual arrival time of the packet.

19. A packet receiver for packet detection in a wireless communication network employing time based scheduling of packets, the packet receiver comprising processing circuitry, the processing circuitry being configured to cause the packet receiver to:
receive a packet from a packet transmitter, wherein the packet comprises a preamble that is composed of a single orthogonal frequency-division multiplexing (OFDM) symbol and represented by a sequence of samples and wherein at least part of the preamble is received within a duration of a packet detection window, the packet detection window being centered on an expected arrival time of the packet; and
perform packet detection to find a start of the packet only on those samples received within the duration of the packet detection window.

20. The packet receiver according to claim 19, wherein the packet receiver is part of a gateway, circuit breaker, circuit protector, transformer, or switchgear.

21. The packet receiver according to claim 19, wherein the duration of the packet detection window corresponds to a difference between an expected arrival time of the packet and an actual arrival time of the packet.

22. A non-transitory storage medium that stores a computer program for packet detection in a wireless communication network that employs time based scheduling of packets, the computer program comprising computer code which, when run on processing circuitry of a packet receiver, causes the packet receiver to:
receive a packet from a packet transmitter, wherein the packet comprises a preamble, wherein the preamble is composed of a single orthogonal frequency-division multiplexing (OFDM) symbol and represented by a sequence of samples and wherein at least part of the preamble is received within a duration of a packet detection window, the packet detection window being centered on an expected arrival time of the packet; and
perform packet detection in order to find a start of the packet only on those samples received within the duration of a packet detection window.

23. The non-transitory storage medium of claim 22, wherein the duration of the packet detection window corresponds to a difference between an expected arrival time of the packet and an actual arrival time of the packet.

* * * * *